(12) United States Patent  
Kurtz et al.

(10) Patent No.: US 7,086,299 B2  
(45) Date of Patent: Aug. 8, 2006

(54) MULTI-LOAD BEAM APPARATUS TO PREVENT IMPROPER OPERATION DUE TO OFF-AXIS LOADS

(75) Inventors: Anthony D. Kurtz, Ridgewood, NJ (US); Adam Kane, Morristown, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 4 days.

(21) Appl. No.: 10/434,146

(22) Filed: May 8, 2003

(65) Prior Publication Data

US 2004/0221664 A1 Nov. 11, 2004

(51) Int. Cl.  
*G01L 1/04* (2006.01)

(52) U.S. Cl. .................................. 73/862.638
(58) Field of Classification Search ..................
73/862.61–862.69; 177/210, 211
See application file for complete search history.

(56) References Cited

U.S. PATENT DOCUMENTS

| | | | | |
|---|---|---|---|---|
| 3,576,128 A | * | 4/1971 | Lockery | 73/862.622 |
| 3,949,603 A | * | 4/1976 | Laimins | 73/862.622 |
| 4,023,634 A | * | 5/1977 | Provi et al. | 73/862.632 |
| 4,128,001 A | * | 12/1978 | Marks | 73/862.622 |
| 4,181,011 A | * | 1/1980 | Brendel | 73/862.633 |
| 4,420,985 A | * | 12/1983 | Raskin | 73/862.633 |
| 4,454,770 A | * | 6/1984 | Kistler | 73/862.633 |
| 4,619,147 A | * | 10/1986 | Yoshimura et al. | 73/862.381 |
| 4,657,097 A | * | 4/1987 | Griffen | 73/862.622 |
| 4,796,474 A | * | 1/1989 | Koenig | 73/862.632 |
| 4,838,369 A | * | 6/1989 | Albert | 73/862.59 |
| 4,899,599 A | * | 2/1990 | Eddens | 73/862.382 |
| 4,899,600 A | * | 2/1990 | Lee | 73/862.626 |
| 5,052,505 A | * | 10/1991 | Naito et al. | 73/862.634 |
| 5,327,791 A | * | 7/1994 | Walker | 73/862.628 |
| 5,336,854 A | * | 8/1994 | Johnson | 73/862.627 |
| 5,391,844 A | * | 2/1995 | Johnson et al. | 73/862.627 |
| 5,440,077 A | * | 8/1995 | Konishi et al. | 73/862.621 |
| 5,539,158 A | * | 7/1996 | Utsunomiya et al. | 73/862.632 |
| 5,773,729 A | * | 6/1998 | Nahar | 73/862.382 |
| 6,092,838 A | * | 7/2000 | Walker | 73/862.474 |
| 6,319,221 B1 | * | 11/2001 | Savage et al. | 604/28 |

* cited by examiner

*Primary Examiner*—Max Noori  
(74) *Attorney, Agent, or Firm*—Plevy, Howard & Darcy PC

(57) ABSTRACT

A multi-load beam transducer includes a fixed member, a movable member, and a plurality of load beams positioned between the members, each beam separated by a given distance normal from each other and positioned about a longitudinal axis between the members. The plurality of load beams are responsive to forces exerted on the members. The transducer further includes a plurality of resistors positioned on selected ones of the plurality of load beams. The resistors have a resistance value which varies with an applied force with the plurality of resistors electrically connected and operable to determine the value of the applied forces.

18 Claims, 4 Drawing Sheets

MULTI-LOAD BEAM APPARATUS TO PREVENT IMPROPER OPERATION DUE TO OFF-AXIS LOADS

RELATED APPLICATION

The application relates to co-pending, commonly assigned U.S. patent application Ser. No. 10/396,241, entitled, "A Load Beam Apparatus Operative to Prevent Improper Operation Due to Off-Axis Loads," filed on Mar. 25, 2003, which is incorporated by reference herein.

FIELD OF THE INVENTION

This application is related to the field of stress measurement devices and load beam transducers and more specifically to a multi-load beam transducer for preventing off-axis loads from affecting the output.

BACKGROUND OF THE INVENTION

As is known in the prior art, load beam transducers optimally function in pure axial tension and compression. In certain applications, off axis loads are involved. These loads can result in inaccurate measurements or could, in fact, damage the beam. Load beams have been employed in many applications. As known in the prior art, side or transverse loads instead of axial loads can cause false reactions or fracture the beam. It is desirable to substantially reduce or eliminate side load effects. It is a further desire to provide another linkage for the beam in the event it does fail.

A load beam is typically small in size, for example, 0.085 inches wide and 0.270 inches thick. The length can be between 0.3 to 1 inch or more. The load beam basically is a relatively thin platform and is the active sensing element where the beam responds to axial tension and compression forces to cause gages or sensors located on the beam to produce an output indicative of the magnitude of the applied force. The beam is designed for maximum micro strain on the gauges located on the beam at maximum rated load. In tension or compression, the load beam can accept off axis perturbations to about 36 inch pounds before yielding and deforming the beam. These loads will be encountered especially in the compression mode, where beam-buckling can also occur. In any event, the critical buckling load is 16 times less, without side support for guiding the load beam in compression.

Co-pending, commonly-owned U.S. patent application Ser. No. 10/396,241, entitled, "A Load Beam Apparatus to Prevent Improper Operation Due to Off-Axis Loads," filed on Mar. 25, 2003, teaches a linear bearing surrounding the beam which protects the load beam from buckling as a result of side or off-axis forces. However, the use of the linear bearing described in the aforementioned patent increases the cost and overall size of the load cell.

One simple remedy to overcome the reduced buckling load along a specific direction is to increase the load beam size in that direction. However, this is disadvantageous as it causes other problems. As one skilled in the art would recognize, the ability of the load-beam to measure stress is reduced by one-half when the cross-sectional area is doubled. Furthermore, as strain is proportional to stress, a reduction by one-half of the stress reduces the strain or deflection by one-half. Finally, as strain is proportional to accuracy, a reduction of one-half of the strain causes a reduction of one-half of the output voltage. Thus, by doubling the cross-sectional shape to increase off-axis force resistance, the measurement accuracy is significantly reduced. For example, doubling the cross-sectional area of a load beam designed to measure a maximum load of 500 lbs. on a 500 lb. scale would result in a measurement device that measures the 500 lb. load on a 1000 lb. scale. Hence, the accuracy of the measurement is reduced.

Accordingly, an improved system is needed that would increase the ability of the beam transducer to withstand excessive side or off-axis forces while maintaining reasonable measurement accuracy.

SUMMARY OF THE INVENTION

A multi-load beam load cell transducer is disclosed. The multi-load beam transducer comprises a fixed member, a movable member, and a plurality of load beams separated by a given distance, each positioned about a longitudinal axis between the fixed member and the moveable member, the plurality of load beams responsive to forces exerted on said members. The transducer further includes piezoresistors positioned on selected ones of the plurality of load beams. The plurality of resistors electrically connected in a bridge configuration and operable to determine the value of the forces applied to the transducer based on changes in the resistance.

BRIEF DESCRIPTION OF THE DRAWINGS

FIG. 1b illustrates a cross-sectional view, through section A—A of the load beam shown in FIG. 1a;

FIG. 3b illustrates a cross sectional view of a multi-load beam load cell shown in FIG. 3a;

FIG. 5b is a side cross-sectional view of the load beam cell of FIG. 5a.

DETAILED DESCRIPTION OF THE INVENTION

Figure 1A:
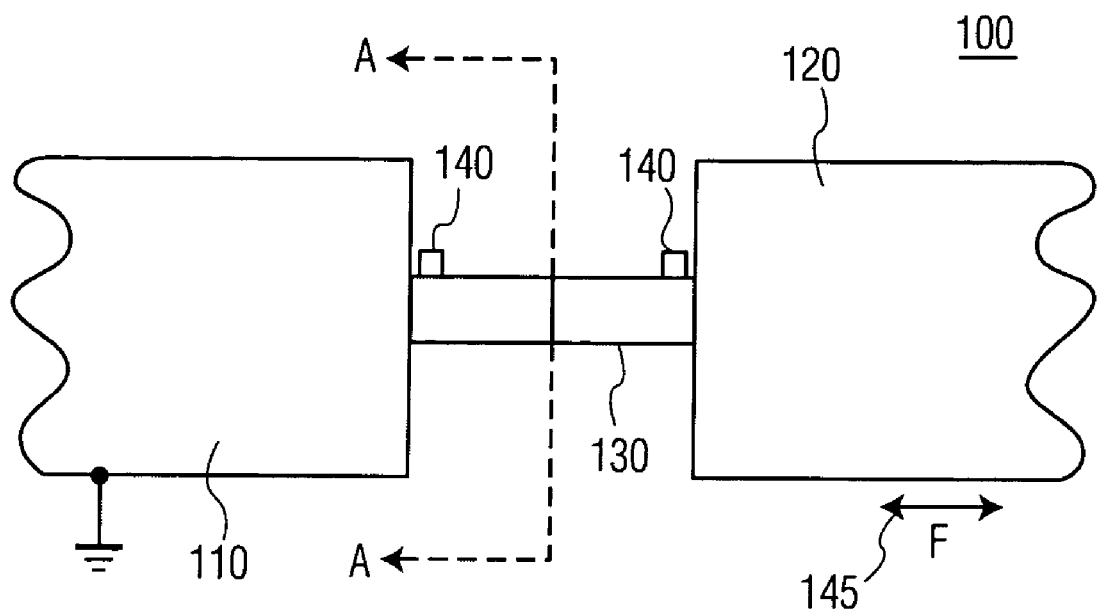
FIG. 1a illustrates a cross-sectional view through a longitudinal axis of a conventional prior art stress measurement load beam.

FIG. 1a illustrates a simplified model of a conventional load beam cell 100. In this model, load cell 100 consists of a fixed or non-moveable first part or member 110, a moveable second part or member 120 and a load beam 130. Positioned on the load beam 130 are piezoresistors 140 that are operable to alter resistance value in response to changes in load beam 130 due to an applied force F. Leads (not shown) are conventionally attached to piezoresistors to configure the resistors 140 in a conventional bridge or circuit. In one aspect, resistors 140 may be configured in a half-Wheatstone bridge configuration. In a second aspect, resistors 140 may be configured in a full Wheatstone bridge configuration. As one skilled in the art would recognize, changes in the resistance of piezoresistors 140 in a Wheatstone bridge configuration are indicative of the magnitude of the applied force. This is well known.

As force 145 is applied to load cell 100, second member 120 moves in accordance with the applied force 145 and the load beam 130 is stressed in response to the applied force 145. The sensors 140 change resistance according to the applied force enabling one to obtain a signal indicative of the force as applied to the beam. More detailed teaching of load cell technology may be found in commonly assigned U.S. patent application Ser. No. 09/814,903, entitled "Force Transducer with Environmental Protection," filed on Mar. 22, 2001. Force 145 as seen in FIG. 1a can cause the beam 130 to undergo compression or tension depending on the direction of the force. Furthermore, although load-cell 100 is designed to measure forces applied along a longitudinal axis, it would be known that forces substantially normal to load cell 100 may also be applied. In cases when the force normal to load-cell 100 is sufficiently large, the failure in load beam 130 may be caused due to buckling or excessive deflection.

Figure 1B:
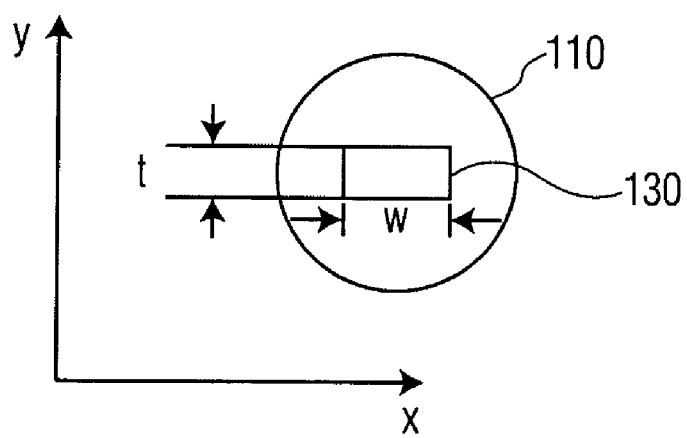

FIG. 1b illustrates a cross-sectional view, through section A—A, of load-cell 100 shown in FIG. 1a. In this case, load-beam 130 has a rectangular cross-section shape having a first length (L) or width (W) along the x-axis greater than a second length or thickness (T) along the y-axis. As one skilled in the art would recognize, the load or force along the y-axis to cause buckling may be significantly less than the load or force along the x-axis as there is a greater stiffness along the x-axis than the y-axis.

Figure 2A:
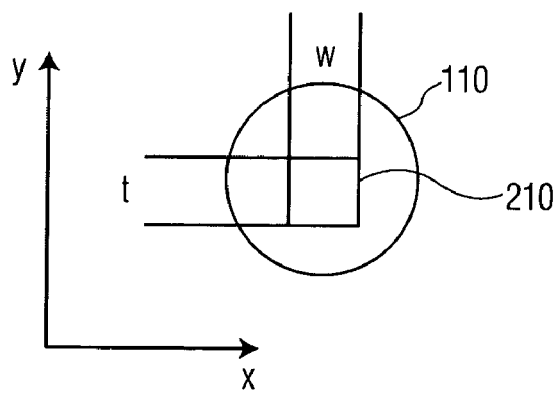
FIGS. 2a–2c illustrate cross-sectional views, similar to those shown in FIG. 1b, of conventional load-beam configurations.
Figure 2B:
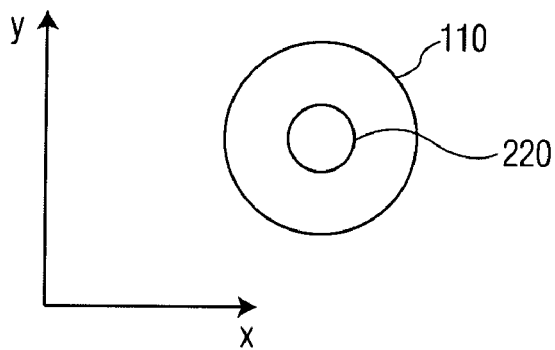
Figure 2C:
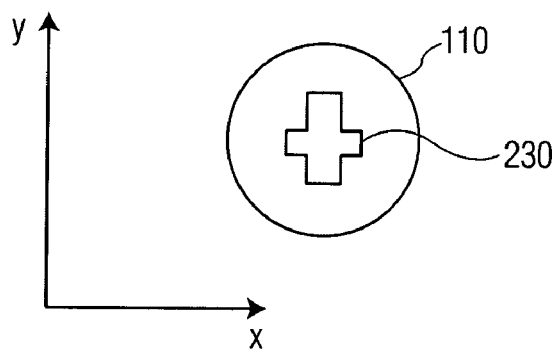

FIG. 2a illustrates a cross-sectional view of load-beam 210 having substantially a square cross section and FIG. 2b illustrates a cross-sectional view of load-beam 220 having substantially a circular cross section. FIG. 2c illustrates a cross-sectional view of load-beam 230 shaped as a "+" or a "cross." These shapes are suitable for load beam design as the force necessary to cause buckling is substantially the same along the x- or y-axis. However, as discussed previously, while these load-beam shapes exhibit advantages with regard to load or force that creates buckling, they also reduce the load beam measurement accuracy.

Returning to FIG. 1b, the rectangular cross-section shape of load beam 130 represents a balance between load-beam size, measurement accuracy and the load-beam's ability to withstand off-axis forces, i.e., forces in the x and/or y directions. More particularly, when the load-beam 130 is made thicker, e.g., along the y-axis as shown in FIG. 2a, as compared to C of FIG. 1b, the accuracy of the measurement is degraded. This is because the ability to respond to the applied forces on load cell 100 is reduced by the increased thickness of the load-beam. Furthermore, when the load-beam 130 is made thinner, in the y-axis for example, significantly less side or off-axis force is necessary to induce a buckling of load-beam 130. As one skilled in the art would recognize, the off-axis force necessary to cause buckling along the y-axis can be significantly less than that along the x-axis for the load-beam 130 shown in FIG. 1b. In FIG. 2a, the off-axis forces are the same and the thickness equals the width.

Figure 3A:
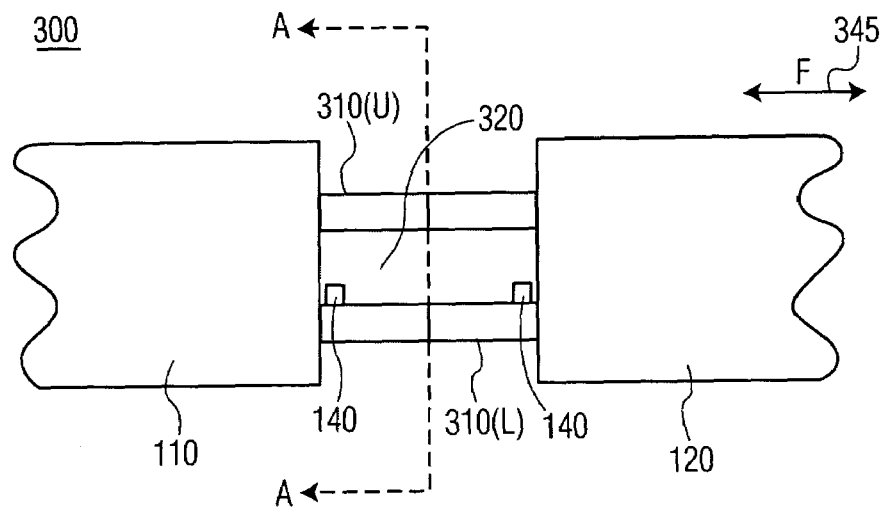
FIG. 3a illustrates a cross-sectional view through a longitudinal axis of an exemplary embodiment of a multi-load beam load cell in accordance with the principles of the invention.
Figure 3B:
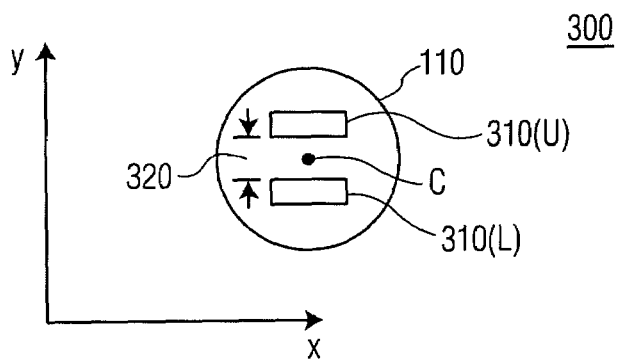

FIG. 3a is a side view of a load beam 300 according to this invention. FIG. 3b illustrates a cross-sectional view taken through line AA of the load beam 300 of FIG. 3a. In this exemplary embodiment, two load beams, referred to as 310(U) and 310(L) are positioned between fixed portion 110 and movable portion 120. Each of the load beams 310(U), 310(L) are separated by a known or given distance 320. In a preferred embodiment, each load-beam 310(U), 310(L) is sized differently than the single load beam 130 shown in FIG. 1b (the sizes are shown in Table 1). Table 1 gives the dimensions of the beam as width x, thickness W×L in inches. The configuration of the beam is also shown according to FIGS. 1b, 2a, 2b, etc.

Piezoresistors 140 may be placed on either load beam 310(U) or 310(L) or both to measure the changes in the corresponding load beam 310 due to the application force 345. In one aspect piezoresistors 140 positioned on the load beam 310 may be connected to a half-Wheatstone or full-Wheatstone bridge to determine the force applied. In a second aspect, piezoresistors 140 may be placed on both of the illustrated load beams 310 (U and L) and electrically connected to a full-Wheatstone bridge. The use of a full Wheatstone bridge is advantageous as it provides for a more accurate determination of the force 345 applied to load cell 300. However, it should be understood that measurement using a half-Wheatstone bridge may also be appropriate for the expected loads or forces to be measured.

FIG. 3b illustrates a cross-sectional view through section A—A of the multi-load beam configuration shown in FIG. 3a. In this case, the distance 320 between load-beam 310(U) and 310(L) is more clearly shown. Load beams 310(U) and 310(L) are shown having a substantially rectangular cross-sectional shape. The beams are parallel to one another and parallel to the longitudinal axis. Although only two beams are shown, uniformly positioned with respect to the center (C) of fixed member 110, it would be recognized by those skilled in the art that more than two beams may be used and, hence, considered within the scope of the invention.

Figure 4:
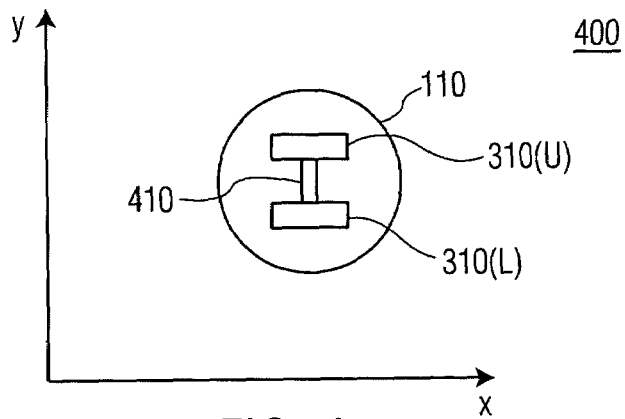
FIG. 4 illustrates a cross-sectional view, similar to that shown in FIG. 3b, of a second embodiment of a multi-load beam load cell in accordance with the principles of the invention.

FIG. 4 illustrates a cross sectional view of a second exemplary embodiment of multi-load beam load cell 400, in accordance with the principles of the invention. In this second embodiment, load beams 310(U) and 310(L) are fabricated between fixed portions 110 and moveable portion 120, as previously discussed. A third beam 410 is positioned substantially perpendicular to load beams 310(U) and 310 (L). In this embodiment of the invention, beam 410 provides additional support to resist off-axis forces and deflection along the y-axis. The configuration shown in FIG. 4 appears as an "I" beam in cross section. Although FIGS. 3b and 4 illustrate embodiments depicting two load-beams, one skilled in the art would recognize that a plurality of load-beams may be fabricated between fixed portion 110 and movable portion 120. Similarly, one of more third beams 410 may be positioned between selected ones of adjacent load-beams 310.

Table 1 illustrates a comparison of buckling loads for several load beam cross sections.

TABLE 1

Buckling Loads

| (W × T) | Buckling Load (lb) | |
| --- | --- | --- |
| | Load$_x$ | Load$_y$ |
| Single Rectangular Beam (0.270 × 0.120) FIG. 1b | 1680 | 475 |
| Single Square Beam (0.270 square) FIG. 2a | 2518 | 2518 |
| Single Circular Beam (0.270 diameter) FIG. 2b | 2004 | 2004 |
| Dual Rectangular Beam (0.270 × 0.120 with spacing of 0.110) FIG. 3a 3b | 3070 | 2407 |
| Dual Rectangular Beam "I-shaped" | 3082 | 2497 |

TABLE 1-continued

Buckling Loads

| (W × T) | Buckling Load (lb) | |
|---|---|---|
| | Load$_x$ | Load$_y$ |
| (0.270 × 0.120 with spacing of 0.110) FIG. 4 | | |
| Dual Rectangular Beam (0.270 × 0.075 with spacing of 0.200) FIG. 3a 3b | 1921 | 2693 |

As expected, the buckling load associated with square- and circular-shaped cross-sectionally shaped load beams is greater than with a rectangular-shaped load beam. However, a dual rectangular beam configuration unexpectedly produces an increase in the buckling load in the order of five (5) times greater than a rectangular beam along the y-axis.

As expected, the load beam having an "I-" or cross-shaped cross-section (FIG. 4) has the highest buckling load. However, one skilled in the art could determine that this cross-sectional shape has an axial stiffness of 1.72 times that of a rectangular shaped cross-section. Hence, while the use of the "I-" or cross-shaped load beam is advantageous to resist off-axis forces, the output using this cross-section shape reduces the full strain output to 0.58 times that of the single rectangular beam.

The characteristics and the performance advantages of a dual load beam load cell transducer over a single load beam load cell may be determined as follows:

A. A load cell having a single load beam that measures 0.270 wide×0.120 thick×0.4 long at a working load of 511 lbs. exhibits a stress of 15771 psi (lbs. per square inch) and a strain of 525 µε. This beam will deflect 0.0002 inches. Assuming maximum load of 1343 lbs., this maximum load will cause a stress of 41450 psi and a strain of 1343 µε in the load beam. In this case, the beam will deflect 0.0005 inches. A failure of beam fabricated from 15-5 steel can be determined to be 3564 lbs. resulting in a failure strain of 3666 µε. The deflection at this failure load can be determined to be 0.0014 in. These determined properties and characteristics are tabulated in Table 2.

B. A load cell having a dual load beam configuration, similar to that shown in FIG. 3a, each beam measuring 0.270×0.075 in., with a spacing of 0.200 in. at a working load of 511 lbs. exhibits a stress of 12617 psi and a strain of 420 µε. The strain is depicted by the unit µε which stands for microstrain. The strain µε, or microstrain, is in inches per inch. Once one knows µε, one multiplies µε by the beam length to calculate beam deflection. Thus, in the table below, a microstrain of 420 µε results in a beam deflection of 0.00017 in. At this load these beams will deflect 0.00017 inches. At the maximum load of 1343 lbs. used previously, this load will cause a stress of 35160 psi and a strain of 1105 µε in the load beams. In this case, a deflection of 0.0004 inches occurs. A failure of the dual load beam configuration fabricated from 15-5 steel can be determined to be 4455 lbs. resulting in a failure strain of 3666 µε. The deflection at this failure load can be determined to be 0.0014 inches. These determined properties and characteristics are tabulated in Table 2.

TABLE 2

Load-Cell Characteristics

| | Rectangular cross-section 0.270 inches wide × 0.120 inches thick × 0.4 inches long | | Dual Beam 0.270 inches wide × 0.075 inches wide × 0.4 inches wide long separated by 0.2 inches | |
|---|---|---|---|---|
| Load | Stress (psi) | Strain (Deflection) | Stress | Strain (Deflection) |
| Work Load (511 lbs.) | 15771 | 525 µε (0.0002 in.) | 12617 | 420 µε (0.00017 in.) |
| Operating Load (1342 lbs.) | 41450 | 1381 µε (0.0005 in.) | 33160 | 1105 µε (0.0004 in.) |
| Failure Load (3564 lbs.) | 110000 | 3666 µε (0.0014 in.) | | |
| Failure Load (4455 lbs.) | | | 110000 | 3666 µε (0.0014 in.) |

As shown in Table 2, the dual load-beam configuration of the present invention is operable to sustain an increase in the order of 1900 lbs. before buckling or a failure occurs. Furthermore, the strain experienced on the beam(s) of the dual load beam configuration at the working load is eighty percent (80%) that of the single load beam configuration. Accordingly, the accuracy of dual load beam configuration is reduced substantially by 80%. As one skilled in the art would recognize, the use of a dual-load beam configuration is a balance between resistance to buckling load and measurement accuracy.

Figure 5A:
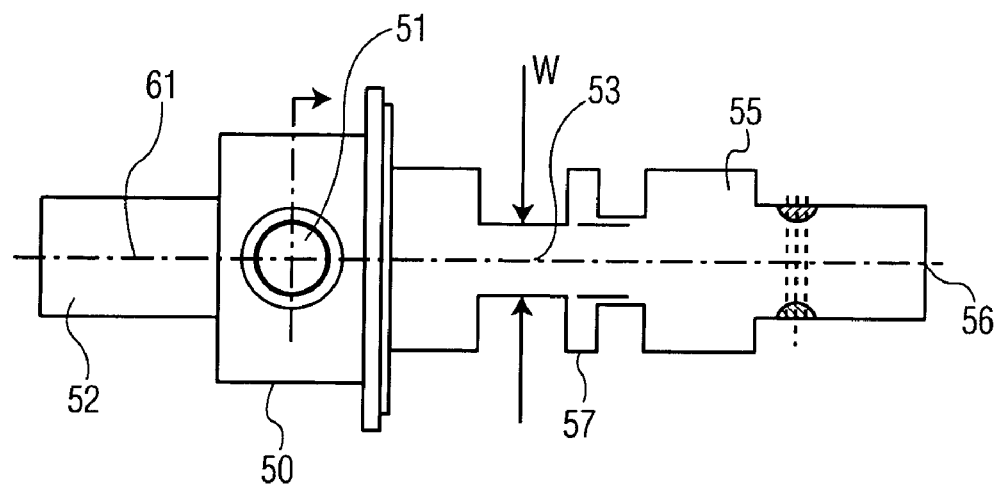
FIG. 5a is a top plan view of a load beam cell according to this invention.
Figure 5B:
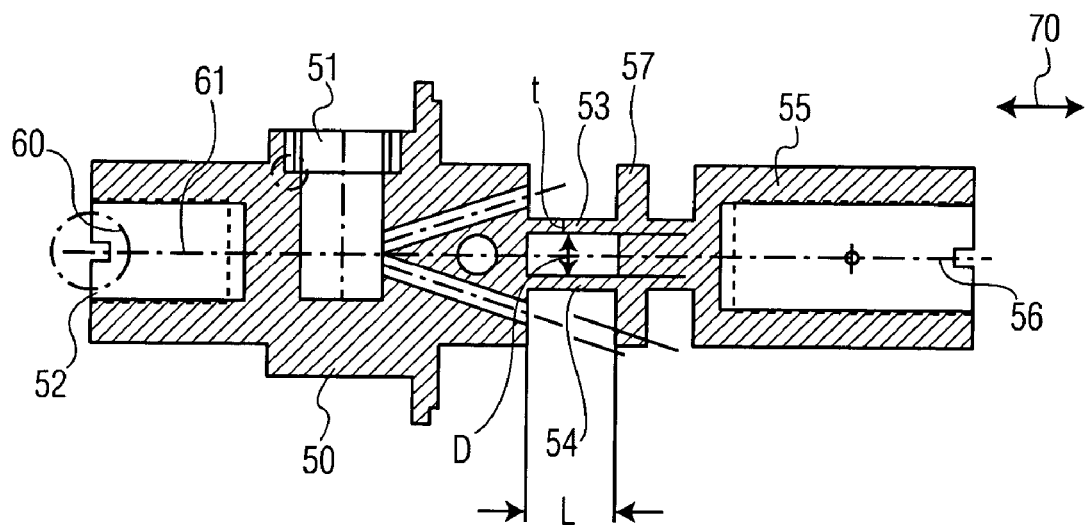

Referring to FIGS. 5a and 5b, there is shown, respectively, a top view in FIG. 5A and a cross-sectional side view in FIG. 5b of a force transducer employing a plurality of beams. Essentially, the structure in FIGS. 5a and 5b depicts a force transducer which utilizes two beams, as will be explained. Referring to FIG. 5a, there is shown a top view of a force transducer employing a plurality of beams. The force transducer, as depicted in FIG. 5a and as shown in FIG. 5b in cross-section, employs two beams designated by reference numerals 53 and 54 in FIG. 5b. The fixed portion, or the non-moveable portion, of the force transducer is generally depicted by reference numeral 50 in both FIGS. 5a and 5b. The non-moveable portion is secured to a ground plane or stationary surface via aperture 51 in section 50 and aperture 60 in section 52. Section 52, as seen, is integrally formed with section 50 and extends therefrom.

As indicated above, there are apertures 51 and 60 in sections 50 and 52. These apertures can accommodate suitable bolts or other fastening means to firmly fix the portion 50 to a fixed area of an aircraft. Essentially, the force transducer, as depicted, is utilized as a force transducer for an aircraft which measures pressure exerted on a moveable member of the aircraft, such as a rudder or elevator structure of the aircraft. The moveable portion of the assembly depicted generally by reference numeral 55, which has an end portion 56. Located in between the fixed portion 50 and the moveable portion 55 are beams 53 and 54. As seen in FIG. 5a, beam 53 is of a given width W and as seen in FIG. 5b, it is of a length L with a thickness T.

Typically, dimensions are as follows, the length L is 0.400 inches, width W is 0.270 inches, while thickness T shown in FIG. 5B, is 0.120 inches. It is seen that the beams 53 and 54 are in parallel and are directed about the longitudinal axis designated by reference 61. The spacing between the beams is indicted by numeral D and is 0.110 inches. As one can see, the moveable portion 55 also has an aperture, which will accommodate a suitable fastener and which is connected directly to the moveable portion of the aircraft such as the rudder. There also is a surrounding flange 57 which serves to strengthen the member and also enables further coupling devices. Located on both or either beams 53 and 54 are piezoresistors, which as indicated above, can be arranged in a Wheatstone or other bridge configuration. As can be seen, when a force is applied in a direction shown by arrow 70, the beams will either be placed in tension or compression and the sensor mounted on the beams will produce output voltages proportional to the magnitude of the applied force. The force transducer from the left to the right end 3.832 inches, with an approximate maximum width of about ¾ of an inch. This, as one can ascertain, is a relatively small device.

The utilization of a plurality of beams as, for example, shown in FIG. 5b, offer substantial improvements over prior art devices. For example, the dual parallel beam, as depicted, can sustain buckling loads that are large and in excess of 1500 pounds or greater. The use of the dual parallel beam enables outputs of 80 percent greater than the outputs of a single beam load cell for the same applied forces.

Thus, there are many advantages in using the above techniques. It would be apparent to one skilled in the art that one can utilize more than two beams, as shown, for example, in FIG. 5b. As one can utilize, for example, three, four beams or more. In a similar manner, one can utilize beams transverse to the beams as shown.

It is thus apparent that there are many alternative designs which one skilled in the art will envision and which are all deemed to be part of the breadth and scope of the claims as appended hereto.

What is claimed is:

1. In combination with a load beam transducer of the type having a fixed member and a moveable member with a first load beam positioned between said members, along a longitudinal axis, an apparatus for providing an improved beam transducer for substantially resisting transverse forces while measuring longitudinal forces, comprising:
    at least a second load beam positioned between said fixed member and said movable member along said longitudinal axis and separated by a given distance from said first beam, said second beam adadted for substantially resisting transverse forces applied to said moveable member; and,
    a plurality of piezoresistive elements on at least one of said first and second load beams, wherein said at least first and second load beams are responsive to forces along said longitudinal axis exerted on said moveable member.

2. The combination as recited in claim 1, wherein: said second load beam is positioned substantially parallel to said first load beam.

3. The combination as recited in claim 2, wherein said load beams are substantially parallel to said longitudinal axis.

4. The combination as recited in claim 1, wherein said given distance is selected to distribute an applied force to said beams relatively uniformly.

5. The combination as recited in claim 1, wherein each said load beam has a rectangular cross-sectional shape having a width and a thickness less than said first length, with said width being larger than said thickness.

6. The combination as recited in claim 1, further including a third beam positioned between said first and second beams and transverse to said first and second beam.

7. The combination according to claim 1 wherein said first beam has force sensors positioned thereon.

8. The combination according to claim 7 wherein said second beam has force sensors positioned thereon.

9. The combination according to claim 8 wherein said force sensors are arranged in a Wheatstone bridge configuration.

10. A multi-load-beam load cell transducer comprising:
    a fixed member;
    a movable member;
    a plurality of load beams positioned along a longitudinal axis between said fixed member and said moveable member, each beam separated from another beam by a given distance normal to said longitudinal axis, said plurality of load beams responsive to forces along said longitudinal axis and being exerted on said moveable member, and resisting transverse forces applied to said moveable member for preventing buckling of said transducer; and,
    a plurality of piezoresistive elements on at least one of said plurality of load beams.

11. The transducer as recited in claim 10, further comprising: a plurality of resistors positioned on selected ones of said plurality of load beams, said resistors having a resistance value which varies according to stress variations.

12. The transducer as recited in claim 10, further comprising: at least one other load beam substantially perpendicular to selected ones of adjacent ones of said plurality of load beams.

13. The transducer as recited in claim 10, wherein each of said load beams has a substantially rectangular cross-sectional shape having a width and a thickness each less than said length.

14. The transducer as recited in claim 13, wherein said load beams are distributed normal to said first length.

15. The transducer as recited in claim 11, wherein said resistors are connected in a configuration selected from a group consisting of: a half-Wheatstone Bridge, or a full-Wheatstone Bridge.

16. The transducer of claim 10, wherein said plurality of load beams are substantially identical.

17. The transducer of claim 10 wherein said plurality of load beams comprises a pair of rectangular shaped load beams uniformly positioned and oppositely disposed with respect to the center of said fixed member.

18. The transducer of claim 10 wherein each of said load beams has a substantially circular cross-sectional shape.

* * * * *